United States Patent [19]

Hitomi et al.

[11] Patent Number: 4,846,117

[45] Date of Patent: Jul. 11, 1989

[54] INTAKE SYSTEM FOR MULTIPLE-CYLINDER ENGINE

[75] Inventors: Mitsuo Hitomi; Akinori Yamashita; Toshihiko Hattori; Yasuhiro Yuzuriha, all of Hiroshima, Japan

[73] Assignee: Mazda Motor Corporation, Hiroshima, Japan

[21] Appl. No.: 184,093

[22] Filed: Apr. 20, 1988

[30] Foreign Application Priority Data

| Apr. 21, 1987 | [JP] | Japan | 62-99472 |
| Apr. 21, 1987 | [JP] | Japan | 62-99474 |
| Apr. 27, 1987 | [JP] | Japan | 62-103959 |
| Jul. 30, 1987 | [JP] | Japan | 62-193101 |

[51] Int. Cl.$^4$ .............................................. F02B 75/18
[52] U.S. Cl. ........................... 123/52 MV; 123/52 ML
[58] Field of Search ......... 123/52 M, 52 MB, 52 MC, 123/52 MV, 52 MF, 52 ML

[56] References Cited

U.S. PATENT DOCUMENTS

| 906,393 | 12/1908 | Dock | 123/53 ML |
| 1,938,164 | 12/1933 | Zurmuhle | 123/52 ML |
| 4,440,120 | 4/1984 | Butler | 123/52 MV |
| 4,649,871 | 3/1987 | Hatamura et al. | 123/52 MV |
| 4,738,229 | 4/1988 | Wada et al. | 123/52 MV |

FOREIGN PATENT DOCUMENTS

| 661896 | 7/1929 | France | 123/52 ML |
| 0052522 | 5/1981 | Japan | 123/52 M |
| 60-14169 | 4/1985 | Japan . | |
| 0116019 | 6/1986 | Japan | 123/52 M |
| 0241418 | 10/1986 | Japan | 123/52 M |

Primary Examiner—David A. Okonsky
Attorney, Agent, or Firm—Gerald J. Ferguson, Jr.

[57] ABSTRACT

A intake system for a multiple-cylinder engine having a plurality of cylinders has a common intake passage open to the atmosphere at its upstream end, a plurality of discrete intake passages which communicate the respective cylinders with the common intake passage by way of intake ports, and a circular passage which is communicated with the cylinders and is adapted to propagate pressure waves generated by the intake strokes without reflecting the pressure waves. A part of the circular passage which does not form a part of the intake air path through which intake air is introduced into the cylinders is smaller in cross-section than a part of the circular passage which forms a part of the intake air path.

18 Claims, 7 Drawing Sheets

INTAKE SYSTEM FOR MULTIPLE-CYLINDER ENGINE

BACKGROUND OF THE INVENTION

1. Field of the Invention

This invention relates to an intake system for a multiple-cylinder engine, and more particularly to an intake system for a multiple-cylinder engine which is arranged to be supercharged by a resonance effect of intake air.

2. Description of the Prior Art

There have been put into practice two types of multiple-cylinder engines which are arranged to be supercharged by kinetic effect of intake air, one being a type supercharged by an inertia effect of intake air and the other being a type supercharged by a resonance effect of intake air.

From the viewpoint of compactly arranging the engine, the latter type is advantageous over the former type in that the former type must be provided with a surge tank which is inherently large in size while in the latter type, the surge tank is not necessarily needed. The engine of the latter type will be referred to as a "resonance-supercharged engine" hereinbelow.

In the resonance-supercharged engine, the engine speed range in which the resonance effect of intake air becomes maximum depends upon the length of the resonance tube which is formed by a part of the intake passage. That is, as the length of the resonance tube increases, the engine speed range in which the resonance effect of intake air becomes maximum is lowered (See Japanese Patent Publication No. 60(1985)-14169, for example.). Accordingly, in order to obtain a satisfactory resonance effect in a low engine speed range, the effective length of the intake passage must be large. On the other hand, in order to obtain a satisfactory resonance effect in a high engine speed range, the effective length of the intake passage must be small.

Thus, it has been difficult to obtain a resonance-supercharged engine in which a satisfactory supercharging effect can be obtained in both a low engine speed range and a high engine speed range.

Further, the length of the resonance tube differs from cylinder to cylinder, that is, the distance between the intake port and the pressure reflecting portion differs from cylinder to cylinder by the distance between adjacent intake ports. If the effective length of the intake passage is shortened in order to enhance the supercharging effect in a higher engine speed range, the difference in the length of the resonance tube becomes larger, and imbalance of the pressure waves acting on the cylinders is enhanced, thereby making it difficult to improve the volumetric efficiency of all the cylinders.

SUMMARY OF THE INVENTION

In view of the foregoing observations and description, the primary object of the present invention is to provide an intake system for a resonance-supercharged multiple-cylinder engine which can satisfactorily supercharge the engine in a high engine speed range and, at the same time, enables sufficiently compact arrangement of the engine.

Another object of the present invention is to provide an intake system for a resonance-supercharged engine which can satisfactorily supercharge the engine over a wide engine speed range without substantially increasing the overall size of the engine.

In accordance with the present invention, there is provided an intake system for a multiple-cylinder engine having a plurality of cylinders comprising a common intake passage open to the atmosphere at its upstream end, a plurality of discrete intake passages which communicate the respective cylinders with the common intake passage by way of intake ports, and a circular passage which is communicated with the cylinders and is adapted to propagate pressure waves generated by the intake strokes without reflecting the pressure waves, a part of the circular passage which does not form a part of the intake air path through which intake air is introduced into the cylinders being smaller in cross-section than a part of the circular passage which forms a part of the intake air path.

With this arrangement, a resonance effect can be obtained between the cylinders by virtue of the pressure wave propagated through the circular passage. Further, when the circular passage is provided in the manner described above, a part of the circular passage does not form a part of the intake air path though forms a part of the pressure path through which the pressure wave is propagated, and by making such a part of the circular passage thinner than the part which forms a part of the intake air path, the circular passage can be made compact and the intake pressure wave can be enhanced.

DESCRIPTION OF THE PREFERRED EMBODIMENT

Figure 1:
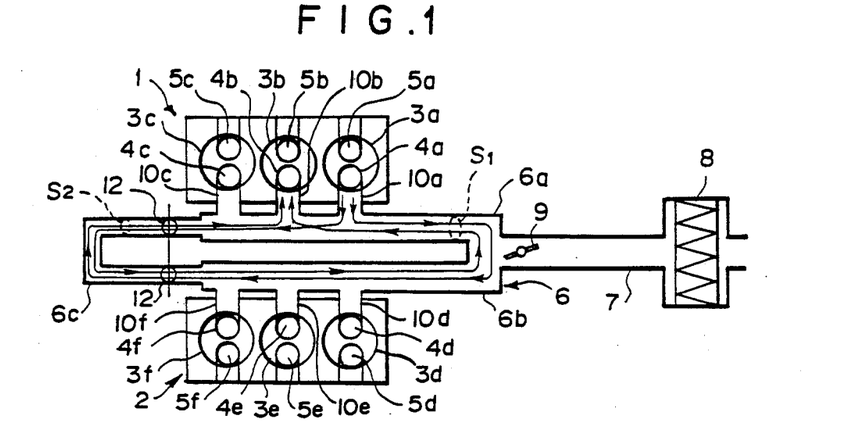
FIG. 1 is a schematic view showing a V-6 engine provided with an intake system in accordance with an embodiment of the present invention.
Figure 2:
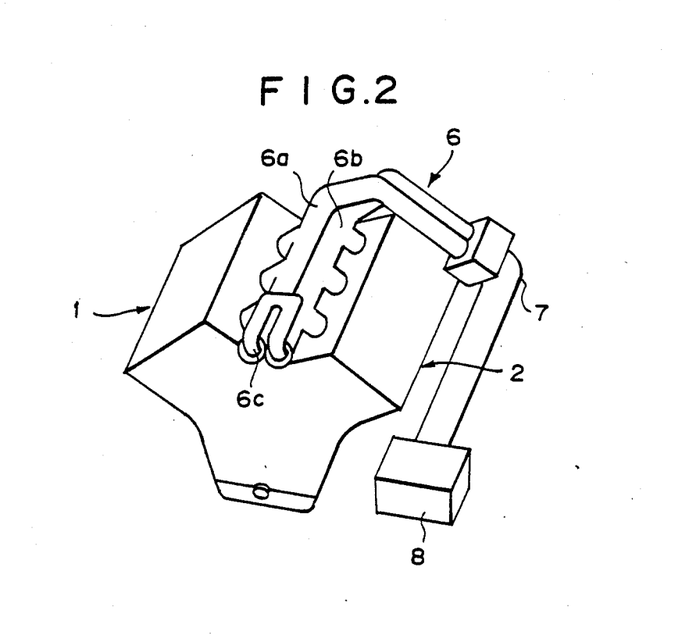
FIG. 2 is a schematic perspective view of the engine shown in FIG. 1.

In FIGS. 1 and 2, an engine body of a V-6 engine having an intake system in accordance with an embodiment of the present invention comprises left and right cylinder banks 1 and 2 set at an angle to each other. No. 1, No. 2 and No. 3 cylinders 3a, 3b and 3c are formed in the left cylinder bank 1, and No. 4, No. 5 and No. 6 cylinders 3d, 3e and 3f are formed in the right cylinder bank 2. The firing order is 1-4-2-5-3-6. That is, the cylinders 3a to 3f are divided into two groups and the cylinders in each group are disposed in one and the same cylinder bank so that the cylinders in each cylinder bank do not fire one after another. The cylinders 3a to 3f are respectively provided with intake ports 4a to 4f which open toward a V-shaped space V between the cylinder banks 1 and 2. Further, the cylinders 3a to 3f are respectively provided with exhaust ports 5a to 5f which open in the sides of the corresponding cylinder banks remote from the V-shaped space V.

The intake ports 4a to 4f for the respective cylinders 3a to 3f are communicated with a circular passage 6 having no surge tank (enlarged volume chamber) and the circular passage 6 is connected to a common intake passage 7 for introducing intake by way of an air cleaner 8 and a throttle valve 9. The circular passage 6 comprises left and right branch passages 6a and 6b which are connected to the downstream end of the common intake passage 7 at the respective upstream ends and connected together at the respective downstream ends. The intake ports 4a to 4c for the cylinders 3a to 3c in the left cylinder bank 1 are separately communicated with the left branch passage 6a by way of discrete intake pipes 10a to 10c which are relatively small in length. Similarly the intake ports 4d to 4f for the cylinders 3d to 3f in the right cylinder bank 2 are separately communicated with the right branch passage 6b by way of discrete intake pipes 10d to 10f which are relatively small in length.

The part of the circular passage 6 upstream of both the junction of the discrete intake pipe 10c to the left branch passage 6a and the junction of the discrete intake pipe 10f to the right branch passage 6b forms a part of the intake air path, that is, intake air introduced into the cylinders 3a to 3f flows through the part. On the other hand, the part 6c of the circular passage 6 downstream of both said junctions does not form a part of the intake air path. That is, intake hardly flows through the part 6c of the circular passage 6. In this embodiment, the part 6c has a cross-section S2 smaller than the cross-section S1 of the other part which is sufficiently large to reduce the intake resistance to ensure a desired intake air amount. The part 6c of the circular passage 6 is provided with a pair of on-off valves 12 which are respective disposed near the upstream side ends of the part 6c in the left and right branch passages 6a and 6b to open and the close the part 6c.

When the intake system of this embodiment is incorporated in the V-type engine, the intake system is positioned with respect to the cylinder banks 1 and 2 so that the left and right branch passages 6a and 6b extend in the direction of the cylinder row in parallel to each other in the space between the cylinder banks 1 and 2 and project forward and rearward from the front and rear ends of the engine body as shown in FIG. 2. The upstream side portion of the circular passage 6 is bent to extend along the end of one of the cylinder banks (the right cylinder bank 2 in the illustrated embodiment) and is connected to the common intake passage 7 on the outer side of the right cylinder bank 2. The downstream side portion of the circular passage 6 is bent upward to extend toward the upstream side. In this manner, the intake system can be compactly incorporated in the engine body without increasing the overall height of the engine and without substantially projecting forward and rearward. Further, the fact that the part 6c of the circular passage 6 is thin further contributes to making compact the overall engine.

Operation of the intake system of this embodiment when the on-off valves 12 are open will be described with reference to FIG. 3, hereinbelow. Near the intake ports for the cylinders which do not continuously fire one after another, for example, near the intake ports 4a to 4c for the cylinders 3a to 3c in the left cylinder bank 1, there are generated basic pressure vibrations (represented by line A in FIG. 3) in which negative pressures are produced in the course of the intake strokes of the respective cylinders 3a to 3c and positive pressures are produced at the end of the intake strokes. For example, the pressure wave generated near the intake port 4a for No. 1 cylinder 3a is propagated along the circular passage 6 in opposite directions and to act on the intake ports for the other cylinders in the cylinder bank, i.e., the intake ports 4b and 4c for No. 2 and No. 3 cylinders 3b and 3c in the left cylinder bank 1 as shown by the arrows in FIG. 1. In this case, the pressure wave is propagated along the circular passage 6 without being reflected since the circular passage 6 has no enlarged volume chamber.

When the time required for the pressure wave to circuit the circular passage 6 is equalized to the period τ of the basic pressure vibrations described above, that is, when the relation between the overall length L of the circular passage 6 (an equivalent length calculated taking into account the influence of the volume of the discrete intake pipes and the like) and the period τ becomes $$\tau = L/a \ldots \quad (1)$$

Figure 3:
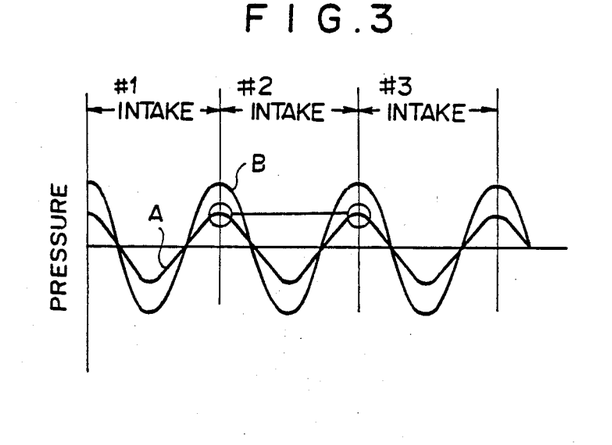
FIG. 3 is a view for illustrating a pressure vibration near the intake ports.

(wherein a represent the speed of sound)

a pressure wave generated in No. 1 cylinder 3a and propagated along the circular passage 6 is superposed on a pressure wave generated in No. 2 cylinder 3b, and the pressure wave propagated from No. 2 cylinder 3b is superposed on a pressure wave generated in No. 3 cylinder 3c in a similar manner, and the pressure wave propagated from No. 3 cylinder 3c is superposed on the next pressure wave generated in No. 1 cylinder 3a in a similar manner as shown by the arrow in FIG. 3. Thus, the pressure waves generated in the cylinders 3a to 3c in the left cylinder bank 1 resonate with each other, whereby the pressure vibration is enhanced as shown by line B in FIG. 3. Similarly, the pressure waves generated in the cylinders 3d to 3f in the right cylinder bank 2 resonate with each other, whereby the pressure vibration is enhanced. By virtue of the resonance effect, the volumetric efficiencies in the respective cylinders can be highly improved.

Though the basis state of resonance in which one pressure wave of the pressure vibration generated in each cylinder group is superposed on the next pressure wave is shown in FIG. 3, a state of resonance can be obtained also when the pressure waves are propagated to be superposed on every second or third pressure wave, and accordingly, a state of resonance can be obtained at engine speeds an integral number of times as high as the engine speed at which said basic state of resonance is obtained.

As regards improving the volumetric efficiency at the high engine speed range, the intake system of this embodiment in which the circular passage 6 is formed is advantageous over an intake system having a pressure reflecting portion upstream of the cylinders without a circular passage.

That is, if the branch passages 6a and 6b are connected with each other only at a portion on the upstream side of the cylinders without being communicated on the downstream side of the cylinders and the junction thereof is arranged to function as a pressure reflecting portion, the volumetric efficiency is improved when a positive pressure wave obtained when a negative pressure wave generated in each cylinder is reflected by the pressure reflecting portion and comes to act on the cylinder to enhance the pressure at the end of the intake stroke, and the relation between the distance from the intake port to the pressure reflecting portion (equivalent length) L' and the period $\tau$ of the pressure vibration at this time is as follows.

$$\tau/2 = 2L'/a \ldots \quad (2)$$

The period $\tau$ of the pressure vibration described above becomes shorter with increase in the engine speed. Accordingly, in order to enhance the supercharging effect in the high engine speed range, the distance L' between the intake port and the pressure reflecting portion must be short. However, the distance between the intake port and the pressure reflecting portion differs from cylinder to cylinder by the distance between adjacent intake ports, and as the distance between the cylinder and the pressure reflecting portion becomes small, the difference becomes relatively large, and imbalance of the pressure waves acting on the cylinders is increased, thereby making it difficult to improve the overall volumetric efficiency.

On the other hand, in the case of the intake system of this embodiment, a resonance effect can be obtained when the formula (1) is satisfied. As can be understood from a comparison of the formulae (1) and (2), the overall length L of the circular passage 6 which satisfies the formula (1) is four times as long as the length L' which satisfies the formula (2) for a given period $\tau$ of the pressure vibration. Accordingly, in the case of the intake system of this embodiment, the relative difference in the length of the pressure propagating path between the cylinders can be kept small even if the intake system is designed to obtain a sufficient resonance effect in the high engine speed range.

Figure 4:
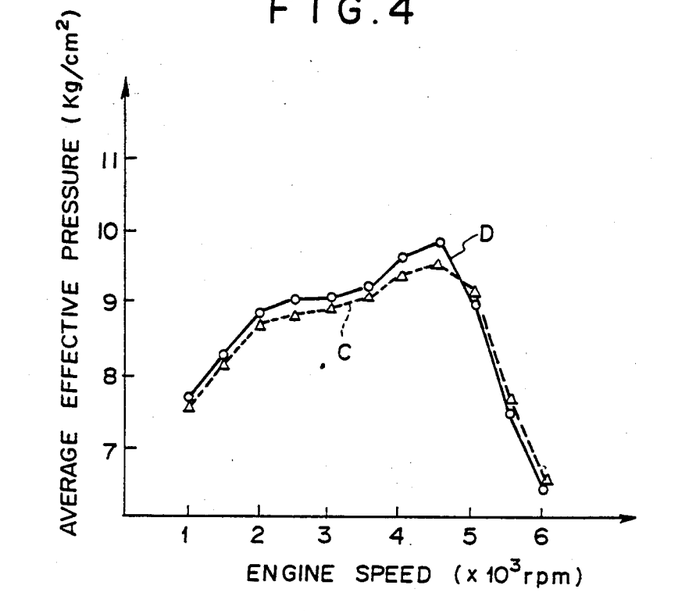
FIG. 4 is a graph for illustrating an effect of the present invention.

Further, by virtue of the fact that the part 6c of the circular passage 6 is relatively small in cross-section, the volumetric efficiency can be further improved. That is, when a pressure wave is propagated through a passage, there is a tendency for the pressure wave to be enhanced as the cross-section of the passage is reduced to a certain extent. However, when the part of the circular passage 6 through which intake air flows is narrowed, the intake air resistance is increased to adversely affect introduction of intake air into the cylinders. Accordingly, by the narrowing the part 6c through which substantially no intake air flows, the resonance effect can be effectively enhanced without adversely affecting introduction of intake air. Curve C in FIG. 4 shows the relation between the engine speed and the average effective pressure in the case that the circular passage 6 has a uniform diameter of 50 mm over the entire length (about 880 mm) thereof, and curve D shows the same in the case that the circular passage 6 is narrowed to a diameter of 40 mm at the part 6c. As can be understood from FIG. 4, by narrowing the part 6c, the average effective pressure can be increased.

Figure 5:
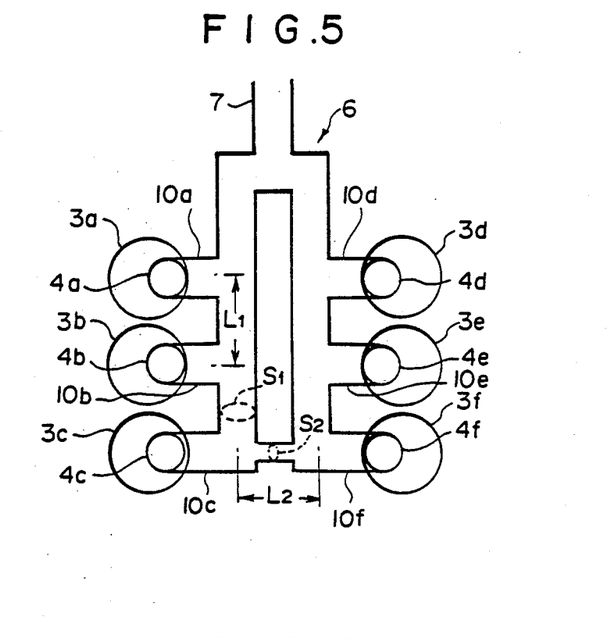
FIG. 5 is a view similar to FIG. 1 but showing a simplified version of the intake system shown in FIG. 1 in order to illustrate a preferred relation between the dimensions related to the circular passage.
Figure 6:
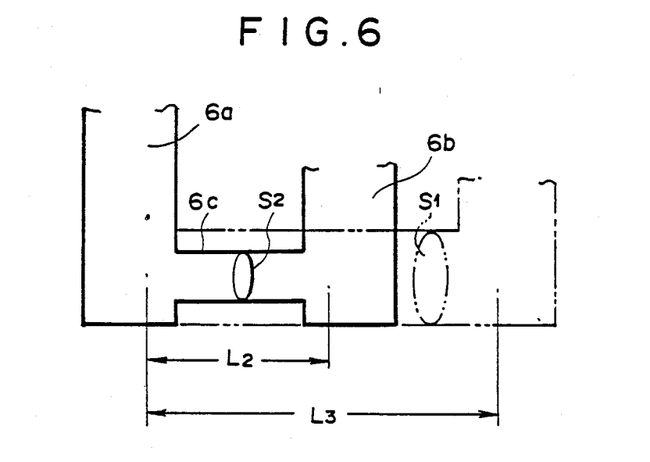
FIG. 6 is an enlarged view of a part of FIG. 5.

It is preferred that the distance between two adjacent discrete intake pipes in each cylinder bank, the cross-section of the part of the circular passage 6 at which the discrete intake pipes are connected to the circular passage 6, the length of the upstream side end portion of the circular passage 6 between the discrete intake pipe 10a for No. 1 cylinder 3a (the upstream-most cylinder in the left cylinder bank 1) and the discrete intake pipe 10d for No. 4 cylinder 3d (the upstream-most cylinder in the right cylinder bank 2), the cross-section of the upstream side end portion of the circular passage 6, the length of the downstream side end portion of the circular passage 6 between the discrete intake passage 10c for No. 3 cylinder 3c (the downstream-most cylinder in the left cylinder bank 1) and the discrete intake pipe 10f for No. 6 cylinder 3f (the downstream-most cylinder in the right cylinder bank 2), and the cross-section of the downstream side end portion of the circular passage 6 satisfy the following formula.

$$L2/S2 > L1/S1$$

wherein L1 and S1 respectively represent the distance between two adjacent discrete intake pipes in each cylinder bank, and the cross-section of the part of the circular passage 6 at which the discrete intake pipes are connected to the circular passage 6, L2 represents the length of the upstream side end portion or the downstream side end portion of the circular passage 6, and S2 represents the cross-section of the upstream side end portion or the downstream side end portion of the same. In the embodiment shown in FIG. 1, the length and the cross-section of the upstream side end portion satisfy the formula since the length is larger than the distance L1 though the cross-section is equal to the cross-section S1, while the length and the cross-section of the downstream side end portion satisfy the formula since the cross-section is smaller than the cross-section S1 though the length is smaller than the distance L1. This will be described in more detail with respect to FIGS. 5 and 6 showing a simplified version of the embodiment shown in FIG. 1.

That is, if the time required for the pressure wave to propagate the upstream side end portion or the downstream side end portion connecting the two cylinder groups is not longer than the time required for the pressure wave to propagate by a distance between two adjacent cylinders in each cylinder group, the condition becomes equivalent to the condition that the cylinders are not divided into two groups, whereby the pressure wave generated in each cylinder will interfere with the pressure waves generated in the cylinders the intake strokes of which occur immediately before and after the intake stroke of the cylinder to weaken the mutual pressure waves. In order to prevent such an interference or in order to make the former time longer than the latter time, said formula must be satisfied. That is, when the cross-section of the passage is partly narrowed, the time required for the pressure wave to pass the narrowed part is elongated, and accordingly, the downstream side end portion 6c having a length of L2 and a cross-section of S2 is equivalent to a passage having a length of L3 and a cross-section of S1 (FIG. 6) so long as the relation between L2, S2, L3 and S1 satisfies the following formula.

$$L3 = L2 \times S1/S2$$

Accordingly when $L2 \times S1/S2 = L3 > L1$ is satisfied, the interference of the pressure waves can be prevented. From this formula, said formula is derived.

When the on-off valves 12 are closed, the pressure wave cannot propagate through the part 6c of the circular passage 6 and reciprocates between each intake port and the upstream side junction of the left and right branch passages 6a and 6b. In this case, the pressure wave is inverted from positive to negative or from negative to positive at the upstream side junction, and accordingly, when the time required for the pressure wave to reciprocate between each intake port and the upstream side junction of the branch passages 6a and 6b is equalized to a half of the period $\tau$ of the basic pressure vibrations described above, the supercharging effect can be increased.

Figure 7:
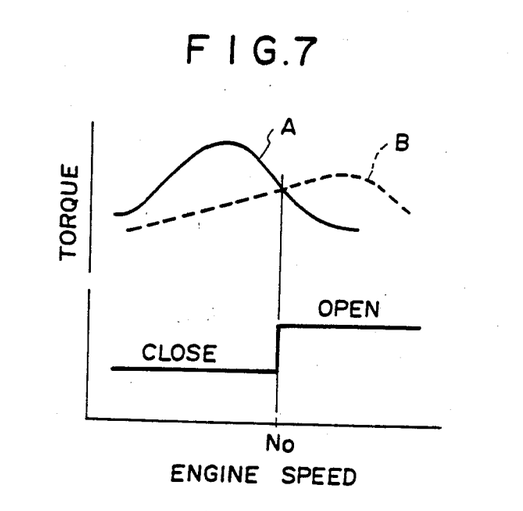
FIG. 7 is a view showing an example of the relation of opening and closure of the on-off valves employed in the embodiment with the engine torque and the engine speed.
Figure 8:
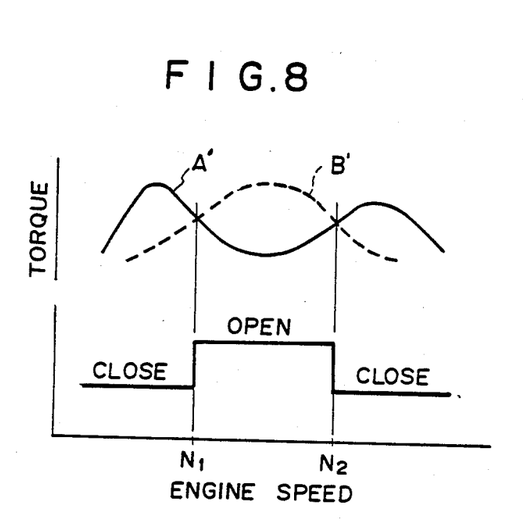
FIG. 8 is a view showing another example of the relation of opening and closure of the on-off valves employed in the embodiment with the engine torque and the engine speed.

By opening and closing the on-off valves according to the engine speed, the engine torque can be increased by the kinetic effect of intake air over a wide engine speed range. For example, when the dimensions of the intake system such as the length of the circular passages 6 are set so that the engine torque characteristics are as shown by curve A in FIG. 7 when the on-off valves 12 are closed and as shown by curve B when the on-off valves 12 are open, that is, so that the kinetic effect is enhanced in the low engine speed range when the valves 12 are closed and in the high engine speed range when the valves 12 are open, the engine torque can be increased over a wide engine speed range by closing the valves when the engine speed is lower than a predetermined speed No and opening when the engine speed is higher than the predetermined speed No. When the dimensions of the intake system such as the length of the circular passages 6 are set so that the engine torque characteristics are as shown by curve A' in FIG. 8 when the on-off valves 12 are closed and as shown by curve B' when the on-off valves 12 are open, that is, so that the kinetic effect is enhanced in the low engine speed range and the high engine speed range when the valves 12 are closed and in the intermediate engine speed range when the valves 12 are open, the engine torque can be increased over a wide engine speed range by closing the valves when the engine speed is lower than a first predetermined speed N1 and when the engine speed is higher than a second predetermined speed N2, and opening when the engine speed is between the first and second predetermined speeds N1 and N2.

Further it is preferred that the length (and the diameter d of each discrete intake pipe be selected to satisfy the following formula $$\frac{\theta}{6} \times \frac{a}{2\pi} \sqrt{\frac{\frac{\pi}{4} d^2}{lVm}} \geq 2Nmax$$

wherein $\theta$ represents the crank-angle degree that the intake valve is open, $N_{max}$ represents the highest acceptable engine speed, a represents the speed of sound and $V_m$ represents the mean volume of the combustion chamber while the intake valve is open. That is, when the above formula is satisfied, inertia effect supercharging cannot occur in the discrete intake pipe. When inertia effect supercharging occurs in the discrete intake pipe, resonance effect supercharging is interfered with. More particularly, as is well known, the inertia effect is a phenomenon wherein a pressure propagates through a distance $2l+\alpha$ ($\alpha$ representing the distance between the piston and the intake valve at the time when the piston speed is at its maximum) during the time interval T from the time at which the piston speed is at its maximum to the end of the intake stroke while a negative pressure wave is converted into a positive pressure wave. The resonant wave which is generated at the end of the intake stroke takes a time T' substantially equal to the time interval T to propagate through a distance 2l. Accordingly, when inertia effect occurs, the phases of the pressure waves differ from each other by about T and thus interfere with each other. Accordingly, it is preferred than the sizes of the discrete intake pipes be selected to satisfy the above formula in order to prevent occurrence of the inertia effect.

Figure 9:
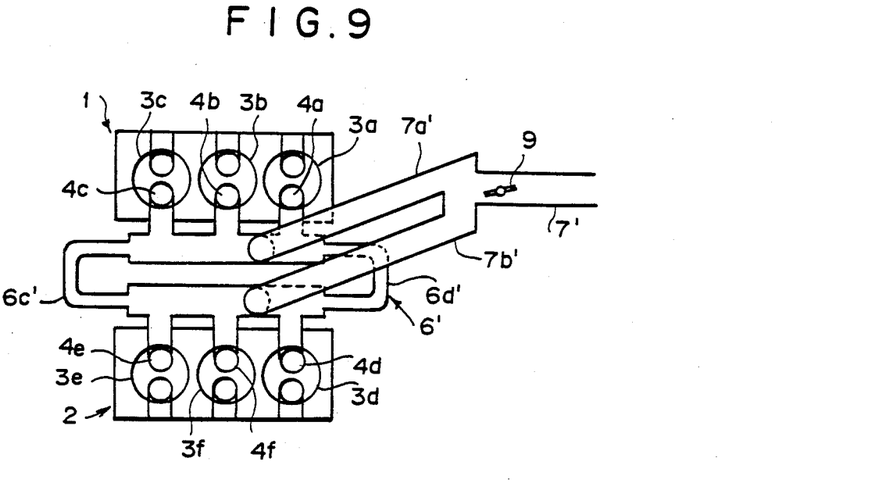
FIGS. 9 to 12 are schematic views respectively showing engines provided with intake systems in accordance with other embodiments of the present invention.

Though in the embodiment described above, intake air is introduced into the cylinders through the upstream side portion of the circular passage 6, as shown in FIG. 9, the circular passage 6 may be separately formed from the intake passage for introducing intake air into the cylinders. In the embodiment shown in FIG. 9, the intake passage for introducing intake air into the cylinders is formed of a pair of branch intake pipes 7a' and 7b' which are connected at the respective upstream ends to the downstream end of a common intake passage 7' open to the atmosphere through an air cleaner (not shown) and connected at the respective downstream ends to a circular passage 6' near the cylinders of the corresponding cylinder groups. With this arrangement, since intake air flows along only a portion of the circular passage 6' near the cylinders and does not flow the upstream side end portion 6d' and the downstream side end portion 6c' of the circular passage 6', the upstream side end portion 6d' and the downstream side portion 6c' are narrowed.

Figure 10:
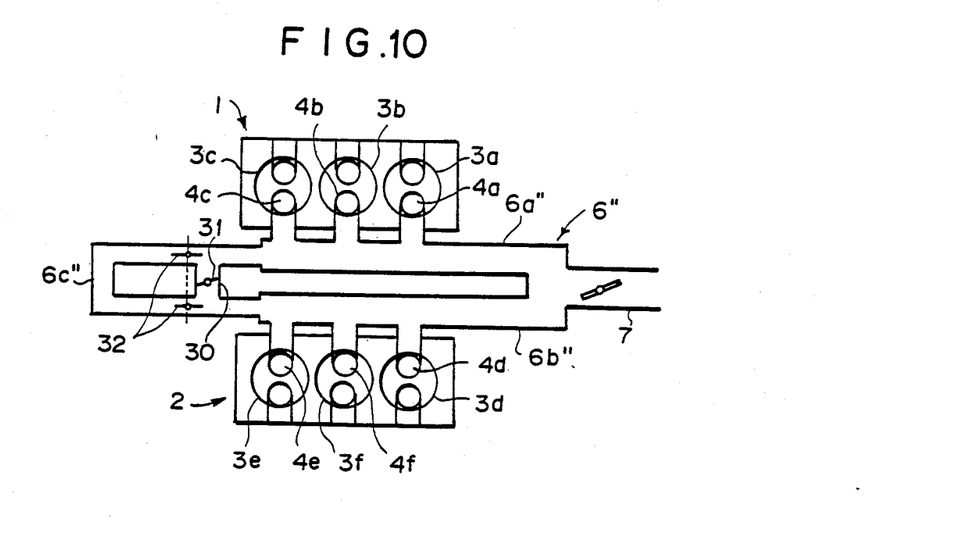

Though in the embodiments described above, the overall length of the circular passage is not variable, the overall length is changed according to the engine speed in the embodiment shown in FIG. 10. That is, in the embodiment shown in FIG. 10, the circular passage 6" is provided with a communicating passage 30 which communicates the branch passages 6a" and 6b" at a portion near the end of the downstream side end portion 6c" of the passage 6". The communicating passage 30 is provided with a first on-off valve 31 and the branch passages 6a" and 6b" are respectively provided with second on-off valves 32 on the downstream side of the communicating passage 30. In this embodiment, when the first on-off valve 31 is opened and the second on-off valves 32 are closed, the effective length of the circular passage 6" is relatively short, and when the first on-off valve 31 is closed and the second on-off valves 32 are opened, the effective length of the circular passage 6" is relatively long. In this manner, the effective length of the circular passage 6" is changed in order to enhance the resonance effect in different engine speed ranges. In this embodiment, the downstream end portions 6c" is narrowed and the communicating passage 30 is formed is at the narrowed downstream end portion 6c".

Figure 11:
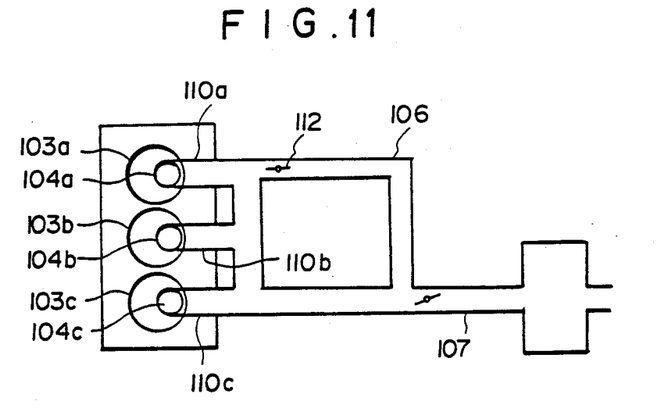

FIG. 11 shows still another embodiment of the present invention in which the present invention is applied to a three-cylinder, in-line engine. In FIG. 11, a three-cylinder, in-line engine has three cylinders 103a, 103b and 103c arranged in a single line. Intake ports 104a, 104b and 104c for the cylinders 103a to 103c are connected by way of short discrete intake pipes 110a to 110c to an intake passage 107 which opens to the atmosphere by way of an air cleaner (not shown). The downstream end portion of the intake passage 107 is extended to turn back and connect to a portion of the intake passage 107 upstream of the discrete intake pipe 110c for the cylinder 103c, i.e., the upstream-most cylinder, thereby forming a circular passage 106 for resonance. The circular passage 106 is provided with an on-off valve 112 which selectively closes and opens the circular passage 106 according to the engine speed. The portion connecting the downstream end of the intake passage 107 and the portion of the intake passage 107 upstream of the discrete intake pipe 110c bypassing the discrete intake pipes 110a to 110c is narrowed.

Figure 12:
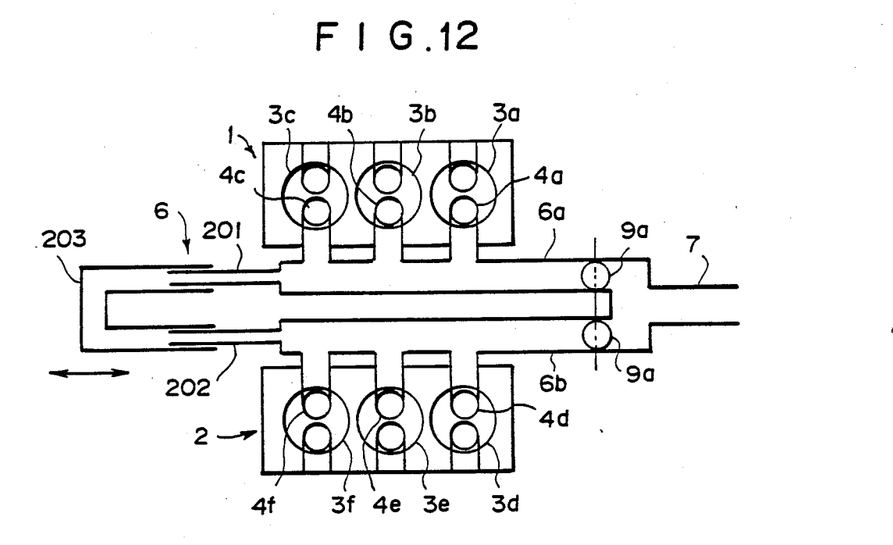
Figure 13:
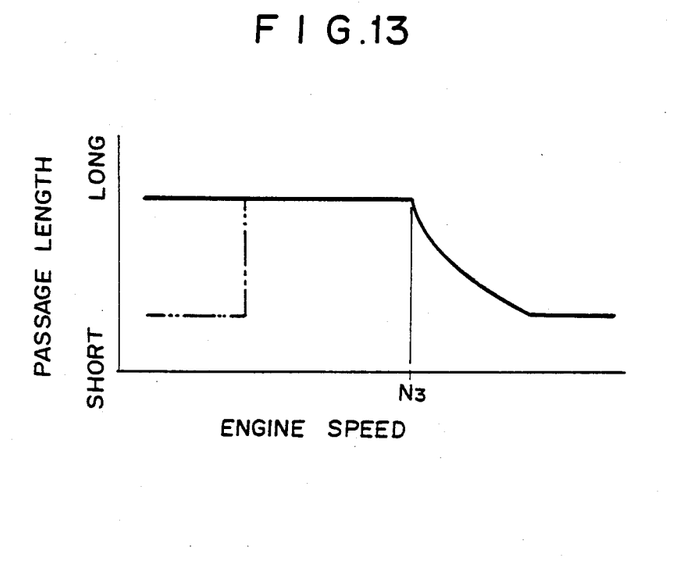
FIG. 13 is a view for illustrating the control to be made on the length of the circular passage according to the engine speed in order to obtain a better resonance effect over a wide engine speed range.

Still another embodiment of the present invention shown in FIG. 12 is very similar to that shown in FIG. 1. Accordingly, the analogous parts are given the same reference numerals as in FIG. 1, and only the difference therebetween will be described here. In this embodiment, the downstream end portion 6c of the circular passage 6 is formed of a narrow extensions 201 and 202 of the respective branch passages 6a and 6b, and a U-shaped movable pipe member 203 which opens at opposite ends. The end portions of the movable pipe member 203 are telescopically fit on the narrow extensions 201 and 202. By sliding the movable pipe member 203 on the narrow extensions 201 and 202, the effective length of the circular passage 6 can be changed. Since, when the effective length of the circular passage 6 is long, the resonance effect is generally obtained in a relatively low engine speed range, and as the effective length of the circular passage 6 reduces, the engine speed range in which the resonance effect can be obtained increases. Accordingly, by moving the movable pipe member to shorten the effective length of the circular passage 6 when the engine speed exceeds a preset value N3 as shown in FIG. 13, the resonance effect can be enjoyed over a wider engine speed range. Depending on the type of the engine, in the engine speed range lower than the range in which the resonance effect can be obtained at the maximum circular passage length, a better resonance effect can be obtained by shortening the effective length of the circular passage 6 as shown by the chain line in FIG. 13.

Though the effective length of the circular passage 6 can be made variable by providing the movable pipe member on the upstream end portion of the circular passage 6, it is advantageous to provided the movable pipe on the downstream end portion as in this embodiment since the downstream end portion can be small in cross-section as described above and accordingly the volume, diameter, length and the like of the movable pipe member may be all smaller.

In FIG. 12, reference numeral 9a denotes a throttle valve.

We claim:

1. An intake system for a multiple-cylinder engine having a plurality of cylinders, said intake system comprising a common intake passage open to the atmosphere at an upstream end thereof, a plurality of discrete intake passages which communicate the respective cylinders with the common intake passage by way of intake ports, and a circular intake passage by way of intake ports, and a circular passage which is communicated with the cylinders and is adapted to propagate pressure waves generated by the intake strokes without reflecting the pressure waves; said cylinders are divided into first and second cylinder groups so that the cylinders in each cylinder group do not fire one after another, the discrete intake passages for the cylinders of the first cylinder group are connected to said common intake passage by way of a first branch passage and the discrete intake passages for the cylinders of the second cylinder group are connected to said common intake passage by way of a second branch passage, said first and second branch passages being connected together by a downstream side end portion at respective downstream ends thereof to form said circular passage, said downstream side end portion being smaller in cross-section than the rest of said circular passage, said circular passage running through the first branch passage, the downstream side end portion, the second branch passage and a junction of the first and second branch passages to the common intake passage, wherein the distance between two adjacent discrete intake passages in each cylinder group the cross-section of each of the branch passages of the circular passage at which the discrete intake passages are connected to the circular passage, the length of an upstream side end portion of the circular passage between the discrete intake passage for an upstream-most cylinder in the first cylinder group and the discrete intake passage for an upstream-most cylinder in the second cylinder group, the cross-section of the upstream side end portion of the circular passage, the length of the downstream side end portion of the circular passage between the discrete intake passage for a downstream-most cylinder in the first cylinder group and the discrete intake passage for downstream-most cylinder in the second cylinder group and the cross-section of the downstream side end portion of the circular passage satisfy the formula $L2/S2 > L1/S1$, in which L1 and S1 respectively represent the distance between two adjacent discrete intake passages in each cylinder group and the cross-section of the branch passages of the circular passage at which the discrete intake passages are connected to the circular passage, L2 represents the length of the upstream side end portion when S2 represents the cross-section of the upstream side end portion, and L2 represents the length of the downstream side end portion when S2 represents the cross-section of the downstream side end portion.

2. The intake system as defined in claim 1, wherein the downstream side end portion of the circular passage between the discrete intake passage for a downstream-most cylinder in the first cylinder group and the discrete intake passage for a downstream-most cylinder in the second cylinder group being smaller in cross-section than the rest of said circular passage and being provided with a mechanism for changing effective length of the path through which said pressure wave propagates.

3. The intake system as defined in claim 1, wherein said first and second branch passages are connected together by the downstream side end portion at respective downstream ends thereof and by the upstream side end portion at respective upstream ends thereof, said first and second branch passages are further connected to said common intake passage by way of separate passages which are connected to the first and second branch passages at portions near the cylinders, and both the upstream side end portion and the downstream side end portion of the circular passage are smaller in diameter than the branch passages intermediate thereof.

4. The intake system as define in claim 1, wherein the downstream side end portion of the circular passage is provided with a variable mechanism which increases torque according to the engine speed.

5. The intake system as defined in claim 4, wherein the variable mechanism is an on-off valve which selectively closes and opens the circular passage.

6. The intake system as defined in claim 5, wherein the engine is a V-type engine having first and second banks, and the cylinders in the first and second banks form the first and second cylinder groups, respectively, further wherein the downstream side end portion of the circular passage extends in the direction of the cylinders of said banks.

7. The intake system as defined in claim 6, wherein the downstream side end portion of the circular passage vertically overlaps with the branch passages.

8. The intake system as defined in claim 1, wherein the engine is a V-type engine having first and second banks, and the cylinders in the first and second banks form the first and second cylinder groups, respectively.

9. The intake system as defined in claim 8, wherein the downstream side end portion of the circular passage extends in the direction of the cylinders of said banks.

10. The intake system as defined in claim 9, wherein the downstream side end portion of the circular passage vertically overlaps with the branch passages.

11. The intake system as defined in claim 10, wherein the downstream side end portion of the circular passage extends along and above the branch passages.

12. The intake system as defined in claim 9, wherein the downstream side end portion of the circular passage is bent toward the upstream side.

13. The intake system as defined in claim 12, wherein the downstream side end portion of the circular passage vertically overlaps with the branch passages.

14. An intake system for a multiple-cylinder engine having a plurality of cylinders, said intake system comprising a common intake passage open to the atmosphere at an upstream end thereof, a plurality of discrete intake passages which communicate the respective cylinders with the common intake passage by way of intake ports, and a circular passage which is communicated with the cylinders and is adapted to propagate pressure waves generated by the intake strokes without reflecting the pressure waves said cylinders are divided into first and second cylinder groups so that the cylinders in each cylinder group do not fire one after another, the discrete intake passages for the cylinders of the first cylinder group are connected to said common intake passage by way of a first branch passage and the discrete intake passages for the cylinders of the second cylinder group are connected to said common intake passage by way of a second branch passage, said first and second branch passages being connected together by a downstream side end portion at respective downstream ends thereof to form said circular passage, said circular passage running through the first branch passage, the donwstream side end portion, the second branch passage and a junction of the first and second branch passages to the common intake passage at an upstream side end portion, and the downstream side end portion of the circular passage between the discrete intake passage for a downstream-most cylinder in the first cylinder group and the discrete intake passage for a downstream-most cylinder in the second cylinder group being smaller in cross-section than the rest of said circular passage and being provided with a mechanism for changing effective length of the path through which said pressure wave propagates.

15. An intake system as defined in claim 14 in which said downstream end portion of the circular passage comprises narrow extensions of the respective branch passages and a U-shaped movable pipe member telescopically fitted on the narrow extensions, thereby forming said mechanism for changing effective length of the path through which said pressure wave propagates.

16. The intake system as defined in claim 14, wherein the downstream side end portion of the circular passage is divided into two passages with on-off valves provided to selectively close and open the two passages, so that the effective length of the path through which said pressure wave propagates is changed.

17. An intake system for a multiple-cylinder engine having a plurality of cylinders, said intake system comprising a common intake passage open to the atmosphere at an upstream end thereof, a plurality of discrete intake passages which communicate the respective cylinders with the common intake passage by way of intake ports, and a circular passage which is communicated with the cylinders and is adapted to propagate pressure waves generated by the intake strokes without reflecting the pressure waves said multiple-cylinder engine is a V-type engine having first and second cylinder banks set at an angle to each other, and the cylinders in each bank do not fire one after another, the discrete intake passages for the cylinders in the first cylinder bank are connected to said common intake passage by way of a first branch passage and the discrete intake passages for the cylinders in the second cylinder bank are connected to the said common intake passage by way of a second branch passage, said first and second branch passages being connected together by a downstream side end portion at respective downstream ends thereof to form said circular passage, said circular passage running through the first branch passage, the downstream side end portion, the second branch passage and a junction of the first and second branch passages to the common intake passage at an upstream side end portion, the downstream side end portion of the circular passage between the discrete intake passage for a downstream-most cylinder in the first cylinder bank and the discrete intake passage for a downstream-most cylinder in the second cylinder bank being smaller in cross-section than the rest of said circular passage and being folded back toward the upstream side, and the upstream side end portion of the first and second branch passages between the discrete intake passage for an upstream-most cylinder in the first cylinder bank and the discrete intake passage for an upstream-most cylinder in the second cylinder bank are each bent to extend along one end of one of the cylinder banks.

18. An intake system for a multiple-cylinder engine having a plurality of cylinders, said intake system comprising a common intake passage open to the atmosphere at an upstream end thereof, a plurality of discrete intake passages which communicate the respective cylinders with the common intake passage by way of intake ports, and a circular passage which is communicated with the cylinders and is adapted to propagate pressure waves generated by the intake strokes without reflecting the pressure waves said cylinders are divided into first and second cylinder groups so that the cylinders in each cylinder group do not fire one after another, the discrete intake passages for the cylinders of the first cylinder group are connected to each other by way of a first branch passage and the discrete intake passages for the cylinders of the second cylinder group are connected to each other by way of a second branch passage, said first and second branch passages being connected together by a downstream side end portion at respective downstream ends thereof and by an upstream side end portion at respective upstream ends thereof to form said circular passage, and being connected to said common intake passage by way of separate passages which are connected to the first and second branch passages at portions near the cylinders, and both the upstream side end portion and the downstream side end portion of the circular passage being smaller in diameter than the branch passages intermediate thereof.

* * * * *